United States Patent [19]

Crapo

[11] Patent Number: 5,987,433
[45] Date of Patent: *Nov. 16, 1999

[54] METHOD AND SYSTEM FOR DEVELOPING A TIME HORIZON BASED INVESTMENT STRATEGY

[75] Inventor: Andrew Walter Crapo, Scotia, N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/659,033

[22] Filed: Jun. 3, 1996

[51] Int. Cl.[6] ............................. G06F 17/00; G06F 19/00
[52] U.S. Cl. ................................. 705/36; 705/35
[58] Field of Search ................. 705/36–39, 35, 705/40, 42

[56] References Cited

U.S. PATENT DOCUMENTS

| 4,953,085 | 8/1990 | Atkins | 705/36 |
| 5,471,575 | 11/1995 | Giansante | 707/503 |
| 5,812,987 | 9/1998 | Luskin et al. | 705/36 |
| 5,852,811 | 12/1998 | Atkins | 705/36 |

FOREIGN PATENT DOCUMENTS

WO 95/06290   9/1995   WIPO .............................. G06F 17/00

OTHER PUBLICATIONS

Wrona, Tom. "WealthBuilder: Build and Maintain Long-Term Personalized Investment Strategies with WealthBuilder," MacUser, vol. 9, No. 3, p. 69, Mar. 1993.

Davis, Kristen. "Money Management Made Easy: These Ten Computer Programs Will Organize Your Financial life—With a Minimum of Pain," Kiplinger's Person Finance Magazine, vol. 46, No. 1, p. 65, Jan. 1992.

*Primary Examiner*—Tariq R. Hafiz
*Assistant Examiner*—Jason W. Rhodes
*Attorney, Agent, or Firm*—Jill M. Breedlove; David C. Goldman

[57] ABSTRACT

The present invention discloses a method and system for developing a time horizon based financial model for investing towards attaining at least one financial objective. Each financial objective is characterized by an event having a financial amount and a future time when the financial amount is expected to be needed. In the present invention, a time horizon is specified in accordance with the financial objectives. In addition, the time horizon is divided into a plurality of segments. An array of future expenses for each of the financial objectives is then provided. The array indicates recurring costs of a specified amount, frequency of the costs, and duration of the costs. A fraction of the future expenses accruing in each time horizon segment is then identified. An investment of a specified amount of money is then modeled during each of the time horizon segments for satisfying the future expenses. The amount of money invested may change as the time horizon changes from segment to segment. Next, an expected rate of return at each time horizon segment is then determined for the invested money. The expected rates of return change as the time horizon changes from segment to segment. The expected rates of return are then used to determine amounts of money to be saved for fulfilling each of the financial objectives. The amount of money saved may change as the time horizon changes from segment to segment.

20 Claims, 6 Drawing Sheets

FIG. 6

METHOD AND SYSTEM FOR DEVELOPING A TIME HORIZON BASED INVESTMENT STRATEGY

BACKGROUND OF THE INVENTION

The present invention relates generally to financial planning and more particularly to a method for developing a financial model that incorporates a time horizon.

In financial planning, a time horizon or investment horizon refers to the time frame in which an individual will be investing. It is a generally accepted principle that investments used for fulfilling near-term financial objectives should be more conservative than investments used for fulfilling long-term financial objectives. The basis for this investment strategy is that a longer time horizon provides sufficient time to ride out the market's periodic swings. Suppose, for example, that an individual wishes to save money for a single financial event expected to occur at a specific point in time, a trip to Europe in 25 years. The initial time horizon is 25 years. However, as the years pass, the time horizon decreases, so in five years, the event will be 20 years away, and in 10 years, the event will be 15 years away, and so on. As the time horizon of the event changes, so should the investment of the funds being saved for the event. Therefore, what may start out to be a long term, fairly aggressive investment strategy where a large amount of money is being invested in stocks should gradually become a short-term, fairly conservative investment strategy where a large amount of money is being invested in short-term reserves. However, the exact mix of asset classes that are invested in depends on the individual's attitude toward risk. Stocks are more risky assets with a higher expected return and short-term reserves are less risky with a lower expected rate of return. As the mix of asset classes change, the overall expected rate of return will decrease. Therefore, it is unreasonable to assume a constant, fixed rate of return over the life of an investment, when that investment is planned for attaining a specific future objective.

While it is common to state the general relevance of time horizon when introducing an individual to the principles of investing, no attempt is usually made to take into account the effect of a changing time horizon when estimating the rate at which savings should be invested in order to prepare for future expenditures associated with fulfilling future financial objectives. Currently available financial models aimed at assisting individuals in making reasonable financial investment decisions focus on the individual's attitude towards risk or risk aversion. The time horizon of the individual is often treated as a secondary consideration and captured as a single value (i.e., the average time horizon at the present time). This single value is then used in various ways along with the individual's risk attitude to help the investor identify a portfolio comprising of a mix of asset classes appropriate for attaining the future financial objectives. In other approaches, the mix of asset classes is used along with historical market data to determine what rate of return the portfolio of asset classes would have attained in the given historical setting. Market forecasting is then used to identify an expected rate of return for the given portfolio, which is generally assumed to be constant. The rate of return is then used to determine the rate of savings (i.e., weekly, monthly, yearly, etc.) required at the assumed rate, assuming inflation and taxes, in order to achieve a future value sufficient for the expected cost of one or more financial objectives.

Since the currently available financial models do not accurately take into account the effect of a changing time horizon, the generated expected rate of return will not be correct since it will be assumed to be constant throughout. This prevents the individual from achieving a future value sufficient to fulfill their desired financial objectives. Therefore, there is a need for a method of developing a financial model that takes into account the effects of a changing time horizon in a general and consistent manner so that if assumptions were met, an individual would be able to achieve a future value sufficient for the expected costs of fulfilling one or more financial objectives.

SUMMARY OF THE INVENTION

Thus, in accordance with the present invention, there is provided a method and system for developing a time horizon based financial model for investing towards attaining at least one financial objective. Each financial objective is characterized by an event having a financial amount and a future time when the financial amount is expected to be needed. In the present invention, a time horizon is specified in accordance with the financial objectives. In addition, the time horizon is divided into a plurality of segments. An array of future expenses for each of the financial objectives is then provided. The array indicates recurring costs of a specified amount, frequency of the costs, and duration of the costs. A fraction of the future expenses accruing in each time horizon segment is then identified. An investment of a specified amount of money is then modeled during each of the time horizon segments for satisfying the future expenses. The amount of money invested may change as the time horizon changes from segment to segment. Next, an expected rate of return at each time horizon segment is then determined for the invested money. The expected rates of return change as the time horizon changes from segment to segment. The expected rates of return are then used to determine amounts of money to be saved for fulfilling each of the financial objectives. The amount of money saved may change as the time horizon changes from segment to segment.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
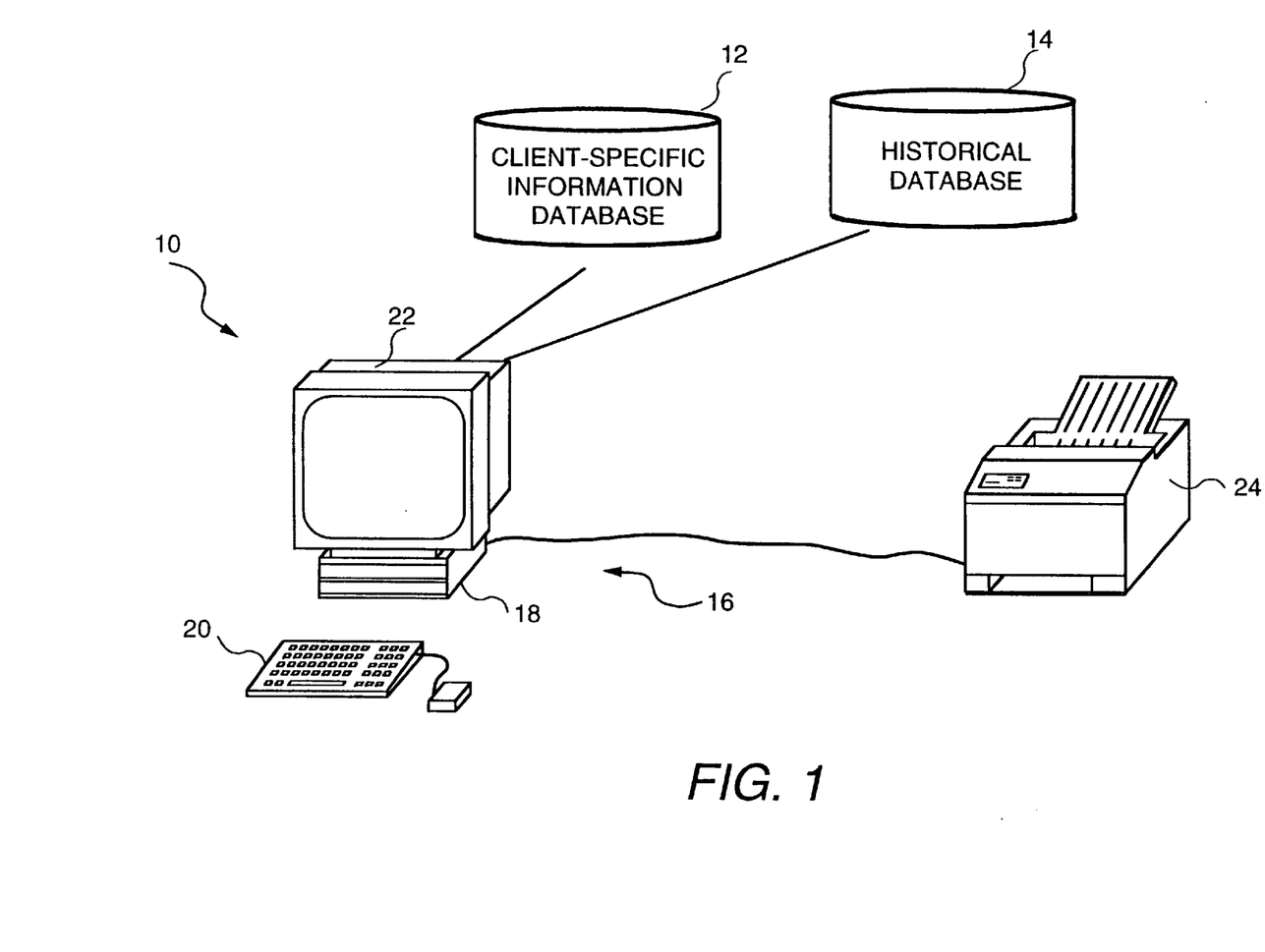
FIG. 1 is a diagram of a system for modeling financial objectives and investments.

FIG. 1 shows a diagram of a system 10 for modeling financial objectives and investments according to the present invention. The system 10 includes a client-specific information database 12, a historical database 14, and a personal computer or work station 16 having a hard drive 18, an input device such as a keyboard 20 and mouse, and an output device such as a display 22 and a printer 24, connected to the databases 12 and 14. The client-specific information database 12 contains personal and family information such as name, date-of-birth, spousal information, and assumptions that are used in the financial model of the present invention for inflation, tax rates, retirement age, etc. The historical database 14 contains information pertaining to rates of return. An individual or couple using the system 10 inputs information such as facts, assumptions, and financial objectives into the computer 16 via the keyboard 20 and mouse. The facts are statements pertaining to the individual's current state of affairs such as name, social security number, date of birth, spouse information, children, the individual's or couple's current financial-objective-related assets, current annual income, current annual savings, college costs, etc. The assumptions are needed to permit a reasonable evaluation of required savings and investments to meet the financial objectives. An illustrative list of the assumptions include the general inflation rate, the individual tax rates, expected rate of increase in salary income, expected retirement age, years that the individual will live in retirement, estimated annual social security benefit, estimated annual pension benefit, rate of increase in annual taxed savings, rate of increase in annual IRA contributions, and investment strategies. The individual's financial goals may be divided into three groups, retirement annual income, educational goals, and special events. The computer 16 processes the facts, assumptions, and financial objectives with the information in the databases 12 and 14 to determine future expenses by time horizon, future expected rates of returns of target portfolios for each time horizon, combined target portfolios for each time horizon, a savings plan necessary to meet the financial objectives, and a portfolio analysis.

Figure 2:
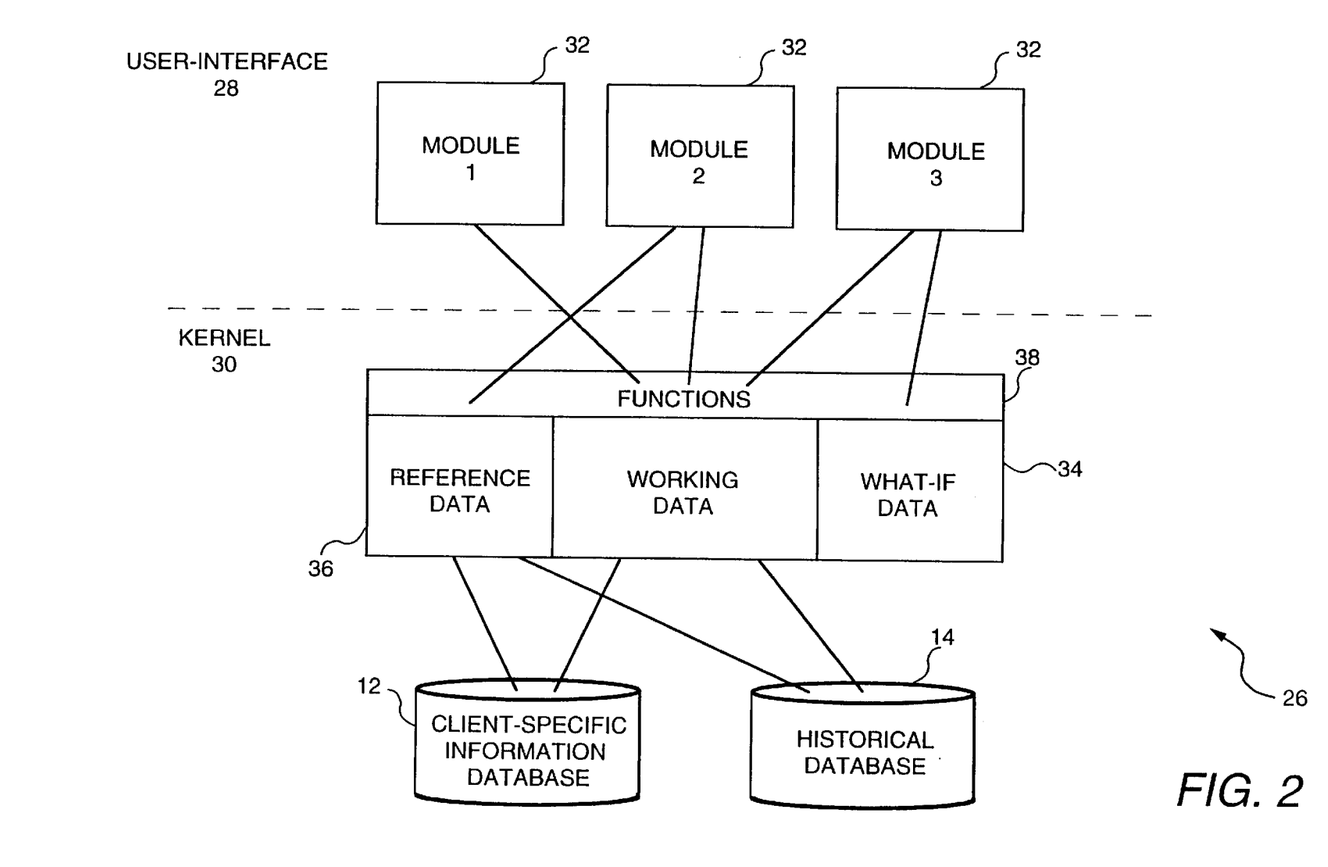
FIG. 2 is a diagram showing the design of the system of the present invention.

A possible design 26 of the system 10 is shown in further detail in FIG. 2. The design 26 includes an user-interface 28 and a kernel 30. The user-interface 28 includes several different modules 32 (i.e., module 1, module 2, module 3) for interacting with the kernel 30 which includes the databases 12 and 14, an in-memory repository 34 of values of key data elements 36, and a plurality of modeling functions 38. In the illustrative embodiment, there are three or more working sets for most of the data elements 36 which includes the REFERENCE dataset, the WORKING dataset, and one or more WHATIF datasets. The datasets provide the ability to answer user questions about what has changed, to answer exploratory questions about the effect of changing one or more values without actually effecting the "working" data, and the ability to determine if the database 12 must be updated when exiting the kernel. An user interacts with the WORKING dataset through module 1 by either viewing the data, editing the data, or evaluating the data. Module 2 lets the user access REFERENCE and WORKING data for comparison purposes. For example, this interface might compare an individual's or couple's current information with data from previous years to identify changes or trends. Module 3 lets the user or couple access the WORKING and WHATIF data. For example, this interface might include worksheets and help screens for evaluating an individual's current financial needs and how they would be affected by changing certain assumptions or financial objectives.

Figure 3:
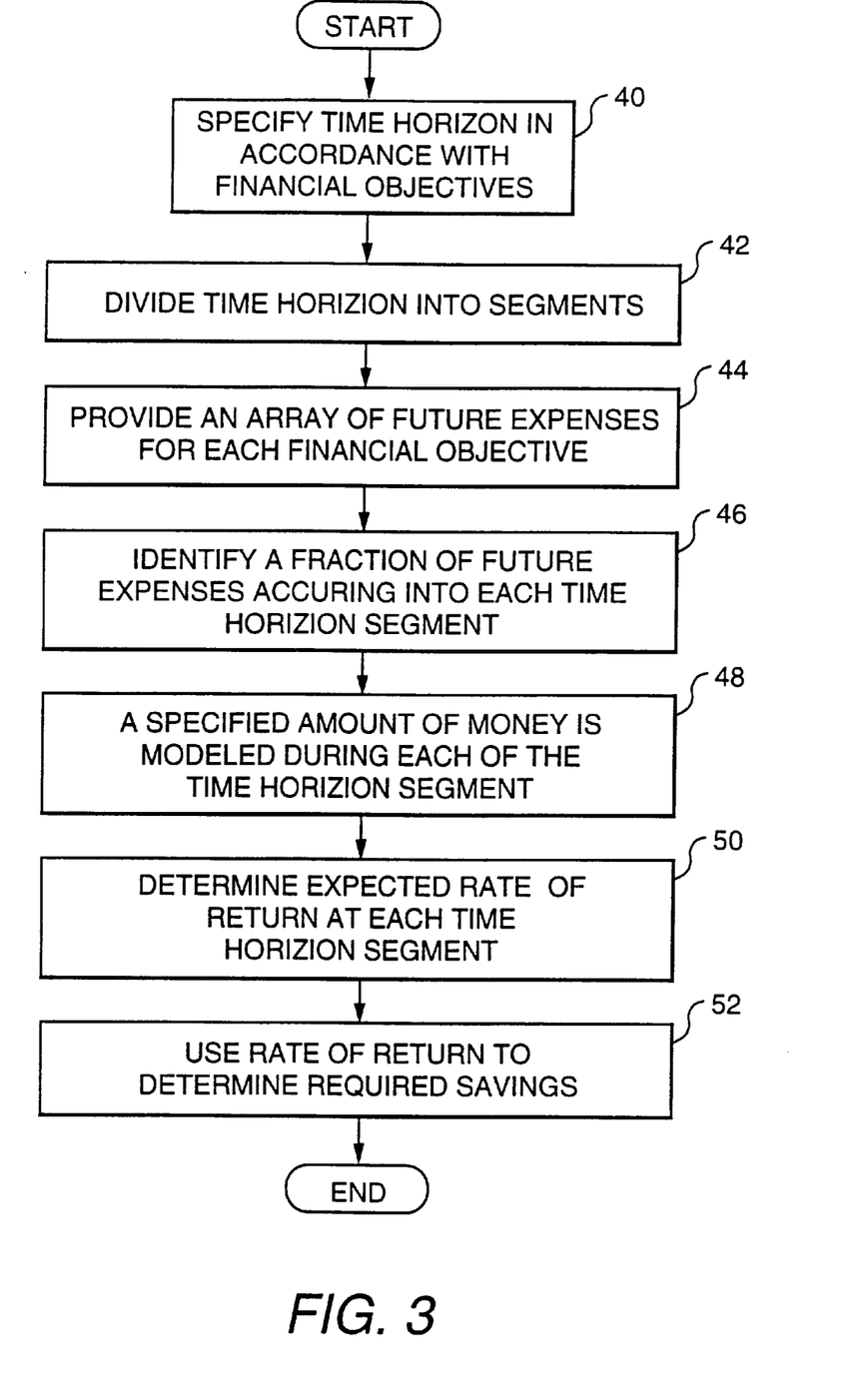
FIG. 3 is a flow chart describing the operation of the present invention.

The above design enables the present invention to apply the concepts of time horizon in a consistent manner so that the effect of a changing time horizon is taken into account in estimating current savings rates required to meet future financial objectives(s). Each financial objective is characterized by an event having a financial amount and a future time when the financial amount is expected to be needed. A flow chart describing the steps performed in the present invention to determine an estimated savings rate is shown in FIG. 3. Initially, at 40, a time horizon is specified in accordance with the financial objectives. Next, the time horizon is divided into a plurality of segments at 42. An array of future expenses for each of the financial objectives is then provided at 44. The array indicates recurring costs of a specified amount, frequency of the costs, and duration of the costs. At 46, a fraction of the future expenses accruing in each time horizon segment is then identified. At 48, an investment of a specified amount of money is then modeled during each of the time horizon segments for satisfying the future expenses. The amount of money invested changes as the time horizon changes from segment to segment. Next, an expected rate of return at each time horizon segment is then determined for the invested money at 50. The expected rates of return change as the time horizon changes from segment to segment. The expected rates of return are then used at 52 to determine amounts of money to be saved for fulfilling each of the financial objectives. The amount of money saved changes as the time horizon changes from segment to segment.

Figure 4:
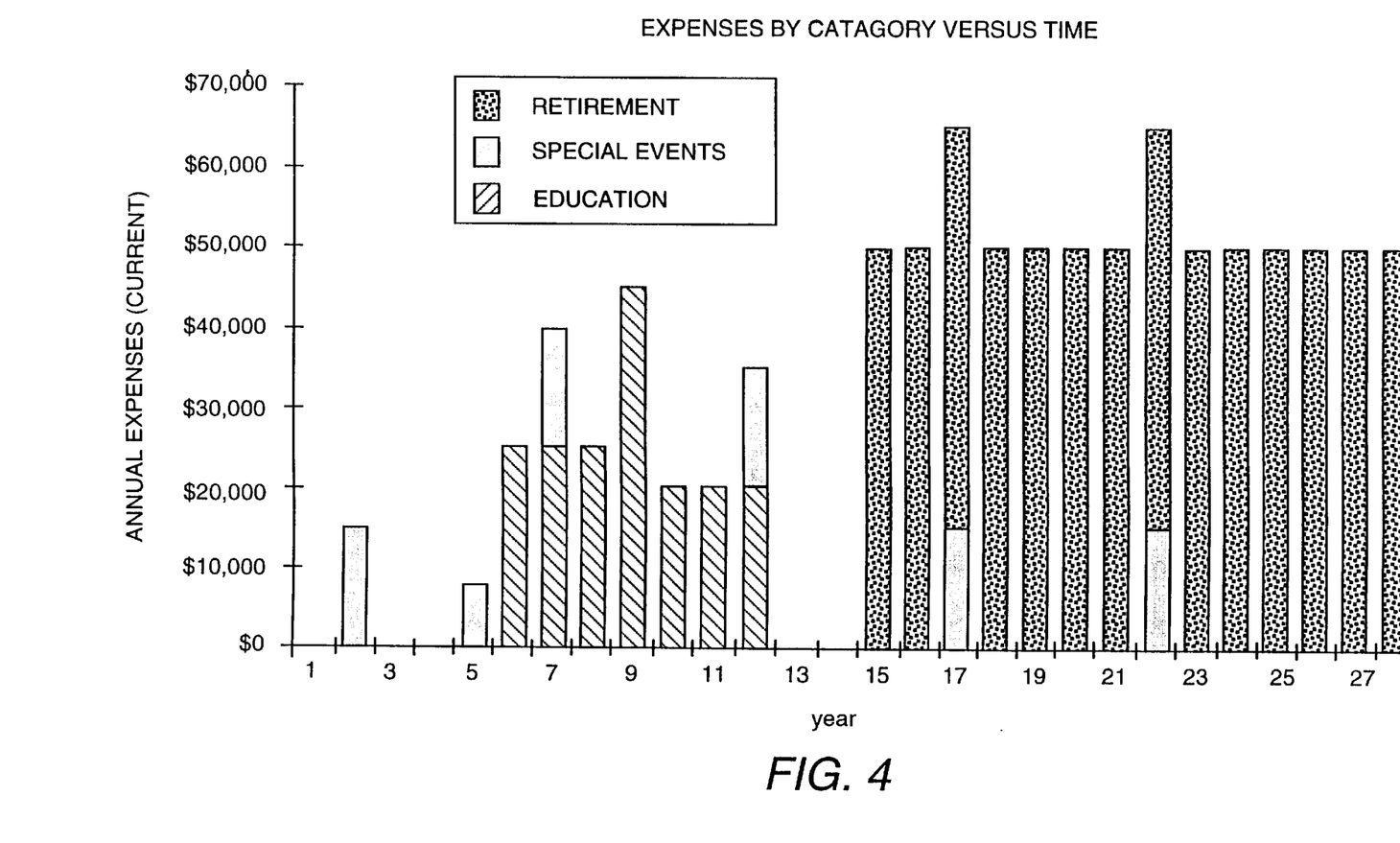
FIG. 4 is an example of a histogram showing an array of expected future costs per year.

An example showing the application of the steps disclosed in FIG. 3 is presented below. Initially as mentioned above, the time horizon for an user is identified and broken up into any desired number of discrete time segments. For example, suppose, the user is savings for several financial objectives over a time horizon having a division of 0–5 years, 6–10 years, 11–15 years, 16–25 years, and over 25 years. In the present invention, the relevant financial objectives are characterized as one or more events. An event may be a one-time cost of a specified amount at some point in the future such as an expected wedding, or it may be a series of recurring costs of a specified amount, frequency, and duration, such as retirement income or college expenditures. Using these set of events (i.e., retirement, special events, education) in the above example, an array of expected future costs per year such as a histogram is constructed. FIG. 4 shows an example of a histogram setting forth expenses on an annual basis for these three series of different events. In the example, series 1 events are college expenses for two children that occur between year 6 through year 12 with an overlap of one year in year 9, series 2 events are special events such as trips or major purchases, and series 3 events are retirement income from savings.

Figure 5:
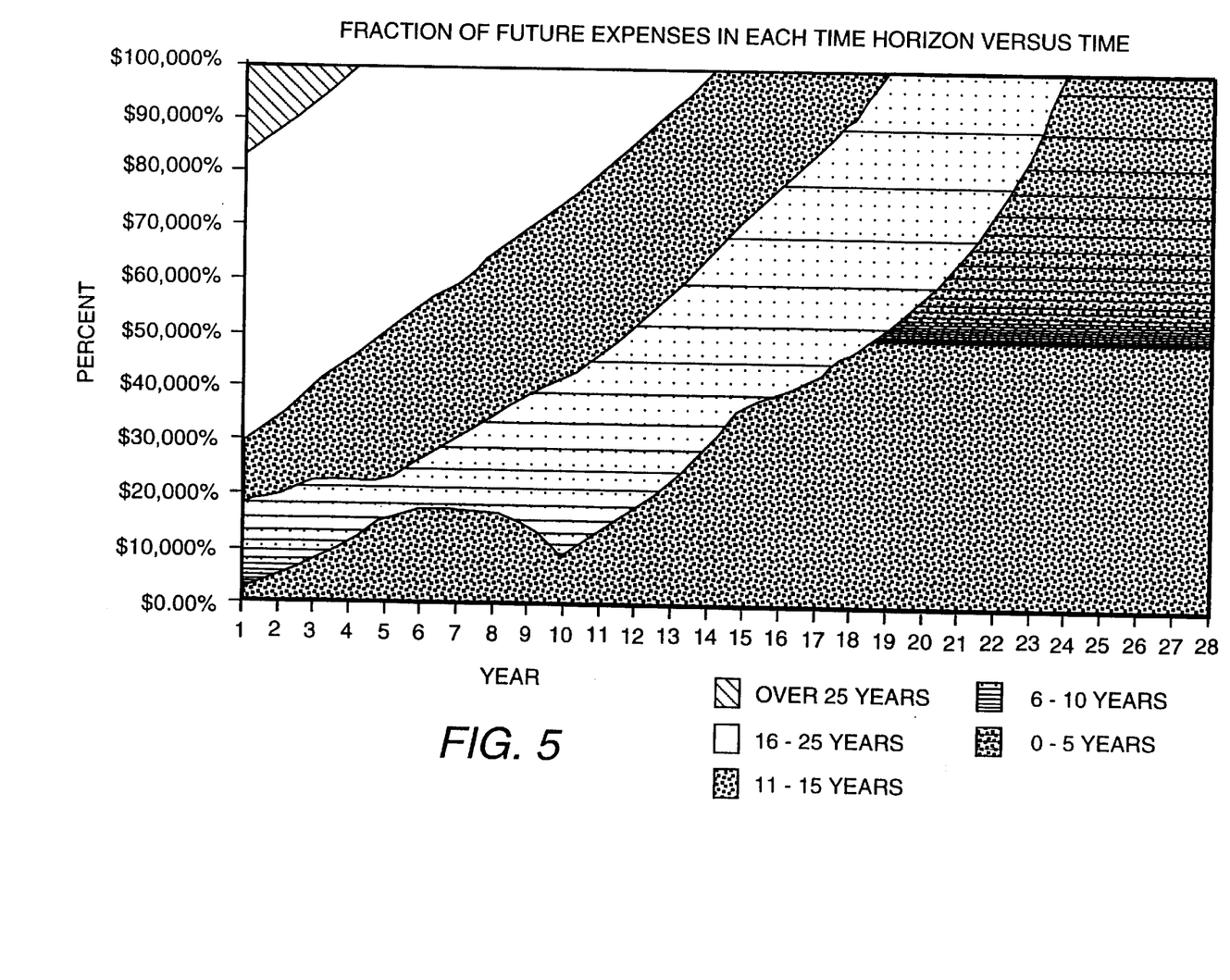
FIG. 5 is an example of a graph plotting percent of future expenditures versus time.

After the histogram of expected future costs per year has been constructed, a fraction of future expenses which fall into each time horizon segment have to be identified. FIG. 5 shows an example of a graph setting forth the percent of future expenditures versus time. In particular, FIG. 5 shows the percent of future expenditures which fall into each of the 5 time-horizon segments 0–5 years, 6–10 years, 11–15 years, 16–25 years, and over 25 years for the events listed in FIG. 4, now and for each future year.

Figure 6:
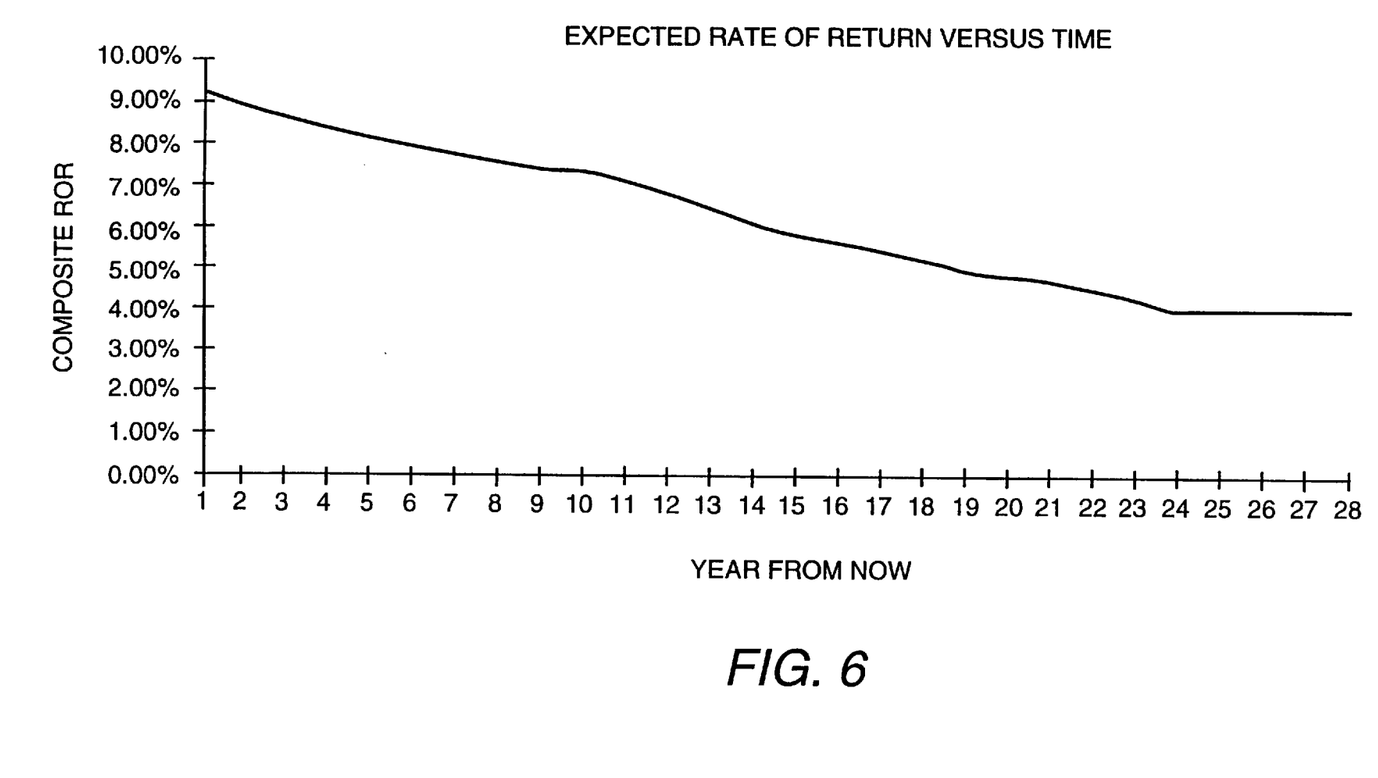
FIG. 6 is an example of a graph showing the overall rate of return versus time.

Next, a weighted average of the expected rate of return for each time horizon segment is determined. Since the expected rate of return of a portfolio of asset classes of a given composition is a linear combination of the expected rates of return of its components, it can be reasonably assumed that an investor applying the concept of time-horizon in the future will invest in a manner such that his/her overall portfolio will have an expected rate of return which is a weighted average of the expected rates of return asso ciated with each of the time horizon segments. Therefore, the overall expected rate of return in the ith period is given by equation 1:

$$r_i = \left(\sum_{j=1}^{h} x_j r_j\right) / \left(\sum_{k=i}^{N} y_k\right), \quad (1)$$

wherein j ranges over the set of time horizon segments, from 1 to H, $r_j$ is the expected rate of return for the jth time horizon, $x_j$ is the amount of future expense in the jth time horizon going forward from the ith period, k ranges over the remaining periods, i to N, and yk is the expected expense in the kth period. For the example shown in FIGS. 4 and 5, the total expenditures in year 1 is $0, $15,000 in year 2, $0 in year 3, $0 in year 4, and $8,000 in year 5, etc. In order to prevent skewing the percentages toward future time horizons, the expenditures need to all be in current dollars, or at least dollars of the same year. Therefore, the total expenditure in the first time horizon (i.e., first 5 years) is $23,000. In other words, at year 1, $23,000 (2.39%) of the expected future expenses fall into the 0–5 year category. Continuing this specific example, if the expected rates of return for each of the 5 time-horizons are 4%, 6%, 8%, 10%, and 12%, respectively, then the expected overall rate of return versus time can be calculated and a graph showing the overall rate of return versus time is shown in FIG. 6.

After determining the overall or composite expected rate of return for each period from the current time period through the end of the time of interest, it is possible to use a standard analysis techniques to determine the amount of money which must be saved during each period. This determination can be made under any of a large number of possible assumptions about taxes, inflation, etc. The results of these calculations have the advantage that if all assumptions about inflation, taxes, rates of return, and future costs actually come to fruition, and the investor behaved in a rational way relative to the varying time-horizons which will exist, the savings thus accrued would be sufficient for attaining the future financial objectives.

Thus, given a set of future expenses estimated from the user's financial objectives and assumptions about inflation, information about expected rates of return, and information about current assets, the present invention determines a saving plan which will allow all financial objectives to be met and "minimized" by some criteria. This task is made more complicated by the differing effects of taxes between taxed and tax-deferred savings and by constraints such as limits on the annual contribution to a 401(k) (tax-deferred) savings plan, limits on IRA savings, and rules about required minimum withdrawals. The following description first considers the simpler problem of required savings in the absence of such constraints and then discusses extending the approach to the more realistic cases which include such constraints.

In the simpler problem, the annual payments, the ith being of value $P_i$, are made into an account of initial value V for a specified number of years m at given annual rates of return (for the jth year, $r_j$). Payments may be constant or may be increased each year by the fraction f, which are assumed to be constant from year to year. A reasonable value for f could be the inflation rate. Taxes are levied on taxable items at the rate $t_j$ in the jth year. At a specified point in the future, time $T_L$, an amount $W_L$ (in current or $T_1$ dollars) will be withdrawn. At time $T_{L+1}$, a second withdrawal, $W_{L+1}$, occurs. Withdrawals continue through year N during which time inflation continues at rate I. At the end of the period of withdrawals, an amount F remains. It is assumed that withdrawals are made at the beginning of each withdrawal period and payments are made at the end of each contribution period. The period of payment and withdrawal may overlap. An account may be either taxable or tax-deferred. Taxable returns are taxed at the end of each year but only the return is taxed. It is assumed that the initial balance V and the payments $P_i$ have already been taxed. Tax-deferred investments are not taxed until withdrawal. The initial balance V in a tax-deferred account as well as the payments $P_i$ are assumed to be pre-tax (i.e., have not yet been taxed). Therefore, any withdrawal from a tax-deferred account is taxed in its entirety at the prevailing tax rate at the time of withdrawal.

Assuming that the account balance is F at the end of the period in which the last withdrawal is made, then the values of the payments to be made under one of two condition, constant payments or adjusted payments has to be determined. In addition, the point in time at which the money spent would exceed the money saved has to be determined. In this scenario, the initial balance is V. The first payment occurs at time $T_1$, at the end of the first period, and the end of accumulation or last payment occurs at time $T_m$. The beginning of withdrawal or first withdrawal occurs at the beginning of the Lth period, at time $T_{L-1}$, and the last withdrawal occurs at time $T_{N-1}$. The future value of the series of payments at time $T_m$ are calculated as follows. For payments of a fixed amount (i.e., of decreasing value), the future value $FVP_m$ at time $T_m$ (at the end of the year in which the last or mth payment is made) of the series of payments, assuming payment is made at the end of each of the m periods starting with period 1 and ending with period m, is given by equation 2

$$FVP_m = P\prod_{i=2}^{m}(1+r_i) + P\prod_{i=3}^{m}(1+r_i) + \quad (2)$$

$$P\prod_{i=4}^{m}(1+r_i) + \ldots + P\prod_{i=m}^{m}(1+r_i) + P$$

$$= P\left\{\sum_{j=1}^{m}\left[\prod_{i=j+1}^{m}(1+r_i)\right] + 1\right\}$$

For the case of payments adjusted upward before each contribution (i.e., payments of constant real value if rate of increase is same as inflation), the future value of the series of payments at time $T_m$ are now considered. If the value of the initial payment is P in current dollars and it is assumed that payment is made at the end of each of the m periods and that each payment increased by the fraction f for each period elapsed, starting at the current time, the future value is given by equation 3:

$$FVP_m = P(1+f)^1\prod_{i=2}^{m}(1+r_i) + P(1+f)^2\prod_{i=3}^{m}(1+r_i) + \quad (3)$$

$$\ldots + P(1+f)^{m-1}\prod_{i=m}^{m}(1+r_i) + P(1+f)^m$$

$$FVP_m = P\left\{\left[\sum_{j=2}^{m}(1+f)^{j-1}\prod_{i=m-(j-2)}^{m}(1+r_i)\right] + (1+f)^m\right\}$$

Therefore, if the initial amount on hand at time $T_0$ is V, then the value of the initial amount plus the stream of payments at time $T_{N-1}$ (the beginning of the last year, i.e. at the time of the last withdrawal) is given by equation 4:

$$FVP_{N-1} = \left[FVP_m + V\prod_{i=1}^{m}(1+r_i)\right]\sum_{j=m+1}^{N-1}(1+r_j), \qquad (4)$$

wherein $FVP_m$ is given by one of the two equations above depending on whether payments are a fixed amount or are adjusted upward before each contribution. Note that if N−1 were replaced by N in equation 4, then the result would be the value of the initial amount plus payments at time $T_N$.

If the withdrawals are considered as a series of payments, then it is assumed that the withdrawals will be increased by the rate of inflation I. If the value at starting time $T_0$ in current ($T_0$) dollars of the money withdrawn at the beginning of the first year of withdrawal (time $T_{L-1}$) is $W_L$, then the future value at time $T_{L-1}$ (in $T_{L-1}$ dollars) of $W_L$ is given by equation 5:

$$FVW_L|_{T_{L-1}} = W_L(1+I)^{L-1} \qquad (5)$$

wherein the value of this withdrawal at time $T_{N-1}$ (time of the last withdrawal) is given by equation 6:

$$FVW_L|_{T_{N-1}}^2 = W_L(1+I)^{(L-1)}\prod_{i=L}^{N-1}(1+r_i) \qquad (6)$$

The value at time $T_{N-1}$ of the last withdrawal is given by equation 7:

$$FVW_N|_{T_{N-1}} = W_N(1+I)^{N-1} \qquad (7)$$

wherein $W_N$ is the amount of the last withdrawal in current ($T_0$) dollars. The value at time $T_{j-1}$ of the jth withdrawal is given by equation 8:

$$FVW_j|_{T_{j-1}} = W_j(1+I)^{j-1}\prod_{i=j}^{N-1}(1+r_i) \qquad (8)$$

Therefore, the value at time $T_{N-1}$ of the total amount needed to provide all withdrawals is given by equation 9:

$$\left[\sum_{j=L}^{N}FVW_j\right]_{T_{N-1}} = \sum_{j=L}^{N}\left[W_j(1+I)^{(j-1)}\prod_{i=j}^{N-1}(1+r_i)\right] \qquad (9)$$

In addition, if the amount of money, in current dollars, to be left at the end of the Nth period is F, then the value of that money at the end of the Nth period is given by equation 10:

$$F|_{T_N} = F(1+I)^N \qquad (10)$$

Since this money can be invested during the last period, the amount needed for the final balance at the time of the last withdrawal, $T_{N-1}$, is given by equation 11:

$$F|_{T_{N-1}} = \frac{F(1+I)^N}{(1+r_N)} \qquad (11)$$

The required payments P can be solved since the value at time $T_{N-1}$ of the initial balance V plus the stream of payments is equal to the value at time $T_{N-1}$ of the withdrawals plus the final balance, which is given by equation (12).

$$\left\langle P\left\{\sum_{j=1}^{m}\left[\prod_{i=j+1}^{m}(1+r_i)\right]+1\right\} + V\prod_{i=1}^{m}(1+r_i)\right\rangle\prod_{j=m+1}^{N-1}(1+r_j) = \qquad (12)$$

$$\sum_{j=L}^{N}\left[W_j(1+I)^{(j-1)}\prod_{i=j}^{N-1}(1+r_i)\right] + \frac{F(1+I)^N}{(1+r_N)}$$

Solving equation 12 for the initial payment P results in equation 13:

$$P = \qquad (13)$$

$$\frac{\left[\frac{\left\{\sum_{j=L}^{N}\left[W_j(1+I)^{(j-1)}\prod_{i=j}^{N-1}(1+r_i)\right]+\frac{F(1+I)^N}{(1+r_N)}\right\}}{\prod_{j=m+1}^{N-1}(1+r_j)} - V\prod_{i=1}^{m}(1+r_i)\right]}{\left\{\sum_{j=1}^{m}\left[\prod_{i=j+1}^{m}(1+r_i)\right]+1\right\}}$$

For the case where payments are adjusted before each contribution, the payment is determined by equation 14.

$$\left\langle P(1+f)\left\{\sum_{j=1}^{m}\left[(1+f)^{j-1}\prod_{i=j+1}^{m}(1+r_i)\right]+1\right\} + \qquad (14)\right.$$

$$\left.V\prod_{i=1}^{m}(1+r_i)\right\rangle\prod_{j=m+1}^{N-1}(1+r_j) =$$

$$\sum_{j=L}^{N}\left[W_j(1+I)^{(j-1)}\prod_{i=j}^{N-1}(1+r_i)\right] + \frac{F(1+I)^n}{(1+r_N)}$$

Solving equation 14 for the initial payment P results in equation 15:

$$P = \qquad (15)$$

$$\frac{\left[\frac{\left\{\sum_{j=L}^{N}\left[W_j(1+I)^{(j-1)}\prod_{i=j}^{N-1}(1+r_i)\right]+\frac{F(1+I)^N}{(1+r_N)}\right\}}{\prod_{j=m+1}^{N-1}(1+r_j)} - V\prod_{i=1}^{m}(1+r_i)\right]}{\left\{\sum_{j=2}^{m}\left[(1+f)^{j-1}\prod_{i=m-(j-2)}^{m}(1+r_i)\right]+(1+f)^m\right\}}$$

In equations 12–15, the variable P is the only unknown variable. All other variables are calculated directly from event planning, tax, inflation, and rate-of-return inputs. However, in the case where payments continue through the withdrawal period, it is possible that a particular payment schedule, while meeting the withdrawal requirements in the long-term, may allow the account balance to become negative during the withdrawal period. This is undesirable and hence it is necessary to check that the account balance does not become negative at any point during withdrawal. If it does, then the "pinchpoint", the year in which it becomes most negative, will be identified and the payments skewed so that more is put in during the first years and less during latter years so that account balance is never negative. To accomplish this, a payment multiplier, $c_j$ is applied to each year's payment. This multiplier will be larger during the first years and smaller during the latter years. Thus, the equation for payments of a fixed amount are defined by equation 16:

$$P = \frac{\left[\left\{\sum_{j=L}^{N}\left[W_j(1+I)^{(j-1)}\prod_{i=j}^{N-1}(1+r_i)\right] + \frac{F(1+I)^N}{(1+r_N)}\right\}}{\prod_{j=m+1}^{N-1}(1+r_j)} - V\prod_{i=1}^{m}(1+r_i)\right]}{\left\{\sum_{j=1}^{m}\left[c_j\prod_{i=j+1}^{m}(1+r_i)\right]+1\right\}} \quad (16)$$

and the equation for payments adjusted before each contribution are defined by equation 17:

$$P = \frac{\left[\left\{\sum_{j=L}^{N}\left[W_j(1+I)^{(j-1)}\prod_{i=j}^{N-1}(1+r_i)\right] + \frac{F(1+I)^N}{(1+r_N)}\right\}}{\prod_{j=m+1}^{N-1}(1+r_j)} - V\prod_{i=1}^{m}(1+r_i)\right]}{\left\{\sum_{j=2}^{m}\left[(1+f)^{j-1}c_{j-1}\prod_{i=m-(j-2)}^{m}(1+r_i)\right]+c_m(1+f)^m\right\}} \quad (17)$$

where $c_j$ is the payment coefficient for the ith year. Initially the $c_i$ are all 1.0, but when an intermediate balance is negative, the $c_i$ before the pinchpoint are increased while those after the pinchpoint are decreased in an interactive fashion until no account balance is negative.

If taxes are now considered in determining the required savings amount, then for a normally taxed investment, the tax is assumed to be paid on the return on investment at the end of each year. It is assumed that any money deposited in the account is taxed before it is deposited and only the interest is taxable at the end of each year. If the amount of the investment at the beginning of the year is $V_i$, rate of return for the year is $r_i$ and the tax rate for the year is $t_i$, the amount at the end of the year $V_{i+1}$ is given by equation 18:

$$V_{i+1}=V_i(1+r_i)-V_ir_it_i=V_i(1+r_i-r_it_i)=V_i(1+r_i(1-t_i)) \quad (18)$$

Hence the after-tax rate of return for a normally taxed investment is given by equation 19:

$$r_i^{at} = \frac{(V_{i+1}-V_i)}{V_i} = [V_i(1+r_i(1-t_i))-V_i]/V_i = \quad (19)$$
$$(1+r_i(1-t_i))-1 = r_i(1-t_i)$$

For a pre-tax initial value $V_0$ invested in a tax-deferred account for n years before withdrawal, the amount at the end of that period and after taxes are paid is given by equation 20:

$$V_n = V_0\left[\prod_{i=1}^{n}(1+R_i)\right](1-t_n) \quad (20)$$

Since the initial money has not been taxed, and if no interest were earned, the tax liability would still be incurred at the end of the investment period, so the effective base amount is given by equation 21:

$$V'_0=V_0(1-t_n) \quad (21)$$

Therefore, the effective after-tax rate of return for the period is given by equation 22:

$$r_{adt} = \sqrt[n]{1+\left(\frac{V_n-V'_0}{V_0}\right)} - 1 = \sqrt[n]{1+(1-t_n)\left[\prod_{i=1}^{n}(1+r_i)-1\right]} - 1 \quad (22)$$

When determining the future value of a series of payments consisting of a normally-taxed and a tax-deferred portion, the equations 18–22 may be used. However, when graphing the values, the value of the tax-deferred portion should be generated by using the above equations for n=0, n=1, n=2, n=3, etc. In other words, to graph the value of the tax-deferred investment in the ith year, it should be assumed that the total amount is withdrawn and the tax paid. This provides the visual effect of showing that the benefit of a tax-deferred investment over a taxed investment is greater for longer periods of investment.

In the present invention, the financial objectives specified for an individual or couple are broken down into retirement income, educational events, and special events. The cost of educational and special events are assumed to be the amount which must actually be paid for the event. Therefore, if money for such an objective comes from a taxed savings account, exactly the amount needed should be withdrawn. If, however, the money for such an objective comes from a tax-deferred account, the amount left after the tax liability is met must equal the goal amount. Therefore, if the tax rate at the time of withdrawal is $t_j$ and the amount needed for the objective is $C_j$, then the amount which must be withdrawn will be given by equation 23:

$$W_j = \frac{C_j}{(1-t_j)} \quad (23)$$

On the other hand, a retirement goal is specified as an annual pre-tax income. Therefore, if after taking into account the expected Social Security and pension benefit, an amount Rj is to be supplied from a tax-deferred account, exactly that amount will be withdrawn from the account. However, if the amount Rj is to be supplied from a taxed account, a smaller amount is withdrawn to provide the same after-tax value. In this case the amount withdrawn will be given by equation 24:

$$W_j=R_j(1-t_j) \quad (24)$$

These adjustments in withdrawal amounts are made by the present invention when meeting the financial objectives of a particular type from funds in a savings account of a particular type. When determining a minimum savings rate to meet goals, the present invention can either treat pre-retirement and post-retirement savings needs separately or can attempt to identify a pre-tax annual savings amount which, when held constant or increased by the same percentage each year, will provide sufficient funds to meet the financial objectives. Details on annual amounts which must be saved to taxed and as tax-deferred accounts, amounts withdrawn from accounts of each type, year-end balances for each type of account, and taxes paid can be provided by the model. In showing taxes paid each year, the amount paid before saving after-tax dollars to taxed accounts is included to provide a more balanced picture of the tax situation.

It is therefore apparent that there has been provided in accordance with the present invention, a method for developing a financial model that takes into account the effects of a changing time horizon that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

The invention claimed is:

1. A computer-implemented method for developing a time horizon based financial model for investing towards attaining at least one financial objective, each financial objective characterized by an event having a financial amount and a future time when the financial amount is expected to be needed, the method comprising the steps of:

specifying a time horizon in accordance with the financial objectives, the time horizon divided into a plurality of segments;

providing an array of future expenses for each of the financial objectives, the array indicating recurring costs of a specified amount, frequency of the costs, and duration of the costs;

identifying a fraction of the future expenses accruing in each of the time horizon segments at each point in time, starting at the present time and going into the future;

modeling an investment of a specified amount of money during each of the time horizon segments for satisfying the future expenses, the amount of money invested changing as the time horizon changes from segment to segment;

determining an expected rate of return at each time horizon segment for the invested money, the expected rate of return changing as the time horizon changes from segment to segment, wherein the expected rate of return is a weighted average defined by:

$$r_i = \left(\sum_{j=1}^{H} x_j r_j\right) / \left(\sum_{k=i}^{N} y_k\right),$$

wherein j ranges over the set of time horizon segments, from 1 to H, $r_j$ is the expected rate of return for the jth time horizon, $x_j$ is the amount of future expense in the jth time horizon going forward from the ith period, k ranges over the remaining periods, i to N, and yk is the expected expense in the kth period;

using the expected rates of return for determining amounts of money to be saved for fulfilling each of the financial objectives, the amount of money saved changing as the time horizon changes from segment to segment; and saving the determined amounts of money for fulfilling each of the financial objectives.

2. The method according to claim 1, wherein the step of modeling comprises selecting a mix of asset classes having varying degrees of risk to be invested in each of the plurality of time horizon segments.

3. The method according to claim 2, further comprising the steps of compiling historical return data for each of the asset classes and using the historical return data to determine the expected rates of return at each time horizon segment.

4. The method according to claim 2, further comprising the step of changing the asset classes as the time horizon changes from segment to segment.

5. The method according to claim 1, wherein the financial objectives comprise events including retirement expenditures, educational expenditures, and special-event expenditures.

6. A system for developing a time horizon based financial model for investing towards attaining at least one financial objective, each financial objective characterized by an event having a financial amount and a future time when the financial amount is expected to be needed, the system comprising:

means for specifying a time horizon in accordance with the financial objectives, the time horizon divided into a plurality of segments;

means for providing an array of future expenses for each of the financial objectives, the array indicating recurring costs of a specified amount, frequency of the costs, and duration of the costs;

means for identifying a fraction of the future expenses accruing in each of the time horizon segments at each point in time, starting at the present time and going into the future;

means for modeling an investment of a specified amount of money during each of the time horizon segments for satisfying the future expenses, the amount of money invested changing as the time horizon changes from segment to segment;

means for determining an expected rate of return at each time horizon segment for the invested money, the expected rate of return changing as the time horizon changes from segment to segment, wherein the expected rate of return is a weighted average defined by:

$$r_i = \left(\sum_{j=1}^{H} x_j r_j\right) / \left(\sum_{k=i}^{N} y_k\right),$$

wherein j ranges over the set of time horizon segments, from 1 to H, $r_j$ is the expected rate of return for the jth time horizon, $x_j$ is the amount of future expense in the jth time horizon going forward from the ith period, k ranges over the remaining periods, i to N, and yk is the expected expense in the kth period;

means for using the expected rates of return for determining amounts of money to be saved for fulfilling each of the financial objectives, the amount of money saved changing as the time horizon changes from segment to segment; and means for saving the determined amounts of money for fulfilling each of the financial objectives.

7. The system according to claim 6, wherein the modeling means comprises means for selecting a mix of asset classes having varying degrees of risk to be invested in each of the plurality of time horizon segments.

8. The system according to claim 7, further comprising means for compiling historical return data for each of the asset classes and using the historical return data to determine the expected rates of return at each time horizon segment.

9. The system according to claim 7, further comprising means for changing the asset classes as the time horizon changes from segment to segment.

10. The system according to claim 6, wherein the financial objectives comprise events including retirement expenditures, educational expenditures, and special-event expenditures.

11. A computer-implemented method for developing a time horizon based financial model for investing towards attaining at least one financial objective, each financial objective characterized by an event having a financial amount and a future time when the financial amount is expected to be needed, comprising:

specifying a time horizon in accordance with the financial objectives, the time horizon divided into a plurality of segments;

providing an array of future expenses for each of the financial objectives, the array indicating recurring costs of a specified amount, frequency of the costs, and duration of the costs;

identifying a fraction of the future expenses accruing in each of the time horizon segments at each point in time, starting at the present time and going into the future;

modeling an investment of a specified amount of money during each of the time horizon segments for satisfying the future expenses, the amount of money invested changing as the time horizon changes from segment to segment;

determining an expected rate of return at each time horizon segment for the invested money, the expected rate of return changing as the time horizon changes from segment to segment, wherein the expected rate of return is a weighted average defined by:

$$r_i = \left(\sum_{j=1}^{H} x_j r_j\right) / \left(\sum_{k=i}^{N} y_k\right),$$

wherein j ranges over the set of time horizon segments, from 1 to H, $r_j$ is the expected rate of return for the jth time horizon, $x_j$ is the amount of future expense in the jth time horizon going forward from the ith period, k ranges over the remaining periods, i to N, and yk is the expected expense in the kth period; and making investments according to the determined expected rates of return for fulfilling each of the financial objectives.

12. The method according to claim 11, wherein the modeling comprises selecting a mix of asset classes having varying degrees of risk to be invested in each of the plurality of time horizon segments.

13. The method according to claim 12, further comprising compiling historical return data for each of the asset classes and using the historical return data to determine the expected rates of return at each time horizon segment.

14. The method according to claim 12, further comprising changing the asset classes as the time horizon changes from segment to segment.

15. The method according to claim 11, wherein the financial objectives comprise events including retirement expenditures, educational expenditures, and special-event expenditures.

16. A system for developing a time horizon based financial model for investing towards attaining at least one financial objective, each financial objective characterized by an event having a financial amount and a future time when the financial amount is expected to be needed, comprising:

means for specifying a time horizon in accordance with the financial objectives, the time horizon divided into a plurality of segments;

means for providing an array of future expenses for each of the financial objectives, the array indicating recurring costs of a specified amount, frequency of the costs, and duration of the costs;

means for identifying a fraction of the future expenses accruing in each of the time horizon segments at each point in time, starting at the present time and going into the future;

means for modeling an investment of a specified amount of money during each of the time horizon segments for satisfying the future expenses, the amount of money invested changing as the time horizon changes from segment to segment;

means for determining an expected rate of return at each time horizon segment for the invested money, the expected rate of return changing as the time horizon changes from segment to segment, wherein the expected rate of return is a weighted average defined by:

$$r_i = \left(\sum_{j=1}^{H} x_j r_j\right) / \left(\sum_{k=i}^{N} y_k\right),$$

wherein j ranges over the set of time horizon segments, from 1 to H, $r_j$ is the expected rate of return for the jth time horizon, $x_j$ is the amount of future expense in the jth time horizon going forward from the ith period, k ranges over the remaining periods, i to N, and yk is the expected expense in the kth period; and means for making investments according to the determined expected rates of return fulfilling each of the financial objectives.

17. The system according to claim 16, wherein the modeling means comprises means for selecting a mix of asset classes having varying degrees of risk to be invested in each of the plurality of time horizon segments.

18. The system according to claim 17, further comprising means for compiling historical return data for each of the asset classes and using the historical return data to determine the expected rates of return at each time horizon segment.

19. The system according to claim 17, further comprising means for changing the asset classes as the time horizon changes from segment to segment.

20. The system according to claim 16, wherein the financial objectives comprise events including retirement expenditures, educational expenditures, and special-event expenditures.

* * * * *